Patented Jan. 22, 1952

2,583,504

UNITED STATES PATENT OFFICE 2,583,504

PROCESS FOR PREPARING ISOOLEFIN-DIOLEFIN COPOLYMERS OF UNIFORM AVERAGE COMPOSITION

David W. Young, Roselle, William J. Sparks, Westfield, and John D. Garber, Cranford, N. J., assignors to Standard Oil Development Company, a corporation of Delaware No Drawing. Application July 8, 1946, Serial No. 682,144

3 Claims. (Cl. 260—85.3)

This invention relates to low temperature olefinic polymers; relates particularly to copolymers of a substantial to major proportion of a diolefin with a remainder of mono olefins; and relates especially to a polymerization process for mixtures of butadiene and diisobutylene in which additional portions of diisobutylene are added in the course of the reaction to maintain the proportions of reaction mixture approximately constant, and to avoid the loss of the butadiene at the close of the reaction.

It has been found possible to copolymerize mixtures of a multi olefin such as butadiene, isoprene, piperylene, dimethyl butadiene, myrcene, dimethallyl, allo-ocymene, and the like, with a mono olefin such as propene, the normal butenes, or any of the normal or iso-olefins having from 5 to about 20 carbon atoms per molecule at a temperature within the range between about +15° C. and —30 to —35° C. by the application to the mixed olefins, in the presence of an inert diluent or diluent refrigerant, if desired, of a Friedel-Crafts catalyst which is preferably aluminum chloride in solution in a low-freezing, non-complex forming solvent, to yield resins which are non-elastomers, but have iodine numbers within the range between 50 and about 250, Staudinger molecular weight numbers within the range between about 1000 and about 20,000; and a sufficient cross-linkage or cyclicization to yield a resin of substantial hardness rather than elasticity. The resulting resin is soluble in the hydrocarbon solvents generally and in a wide range of drying oils, semi-drying oils, baking oils, and the like, to yield a solution which can be heat-bodied, both the drying oil and the resin being simultaneously heat-bodied to produce a very valuable paint enamel or varnish base. However, difficulty is experienced in the polymerization step because of the change in composition of the polymerization mixture as the reaction proceeds, since in practically every copolymerization mixture one component polymerizes more easily and rapidly than the other. Accordingly, a material feed mixture which is balanced to yield a desired type of resin at the beginning of the reaction will at the close of the reaction yield a resin much higher in one component than the initial product; this characteristic being due to the difference in polymerizability. This characteristic results in a resin of uneven character, and if the diolefin is the less reactive component, the resin produced at the beginning of the reaction is sufficiently stable to permit of a heat treatment to remove the solvent, diluent, and the like, whereas the resin produced at the end of the reaction, being considerably higher in multiolefin content, may be so much more reactive that it sets or gels from the heat necessary to volatilize out the diluent, catalyst solvent and the like. Accordingly, it had been the custom in the past to discontinue the reaction when from 60 to 75% of the olefinic material has polymerized, in order to maintain a reasonably uniform quality of resin. This, however, is wasteful of material, since the high intersolubility of the resin polymer and the olefinic raw materials makes it extremely difficult to separate out and recover the unpolymerized multiolefin especially.

According to the present invention, an original mixture is prepared in which the multiolefin and olefin are present in proportion to yield, at the beginning of the reaction, the desired resin; and as the reaction proceeds, additional amounts of the more reactive component, usually the mono olefin, are added especially just at or just before the close to maintain an optimum proportion of multi olefin and mono olefin to permit of the continuing production of exactly the desired resin, the reaction being then carried nearly or wholly to completion, and the final polymer product is obtained with the same characteristics and components as the initial portion of the polymer.

Thus the process of the invention polymerizes a mixture containing from 30% to 60, 70 or 80% butadiene with from 70% to 30 or 20% of diisobutylene at a temperature preferably in the neighborhood of approximately —15° C. obtained by a cold propane reflux, in the presence of a diluent such as ethyl or methyl chloride, if desired, or a hydrocarbon diluent, by the application to the cold mixture of a Friedel-Crafts catalyst such as aluminum chloride in solution in ethyl or methyl chloride, the catalyst being added in a small stream over a time interval of from 15 minutes to several hours, and a small continuing amount of the more easily polymerizable component, usually the diisobutylene being added along with the catalyst and stirred in for subsequent copolymerization to yield a resin of good hardness, a melting point (by the ball and ring method) of from 70° C. to 140° C., an iodine number within the range between about 50 and 200 and a Staudinger molecular weight number within the range between 1000 or 20000 and about 35,000. Other objects and details of the invention will be apparent from the following description:

In practicing the present invention, the olefinic mixture is first prepared. This mixture preferably consists of a multiolefin and a monoolefin. For the multi olefin, any compound having more than one double linkage to the molecule and from 4 to about 14 carbon atoms per molecule is useful, without regard to the position of the double linkages, or the character or position of side chain substituents. The preferred multiolefin is butadiene, because of its low price and availability. Alternatively, however, such substances as isoprene, piperylene, dimethyl butadiene, myrcene, allo-ocymene and the like are included. Similarly, various of the ethers of the monoolefins and mixed ethers of the diolefins are usable. For the monoolefin, any of the monoolefins having from 3 to about 20 carbon atoms per molecule, with the exception of isobutylene, are useful. Isobutylene, because of its extremely high polymerization reactivity does not produce a resin in the present process but produces practically simple polyisobutylene, or the well-known "butyl" which is an elastomer, not a resin. That is, all of the normal monoolefins having from 3 to 20 carbon atoms per molecule are useful and all of the secondary olefins having from 5 to 20 carbon atoms are useful in the present process.

The preferred materials, however, are butadiene and diisobutylene or the octene having 3 methyl group side chains and a single unit of unsaturation. Next choice to diisobutylene however, is isopentene, followed in sequence by the isohexenes, the isoheptenes, the normal butenes, propylene, and so on, the higher molecular weight substances being just about as good, but much less easily available.

The mixture may contain from 40% to 60%, 70% or even 80% of the multiolefin, preferably the butadiene, from 60% to 40%, 30% or even 20% of the monoolefin. It may be noted that a low percentage of diolefin yields a soft resin with reduced brittleness and lower reactivity, whereas the high proportions of diolefin yield a more brittle resin of higher reactivity.

This mixture of multi olefin and mono olefin is preferably cooled to a temperature within the range between about +15° C. and about −30 or −35° C. preferably between +15° C. and −19° C. by any convenient means. A refrigerating jacket on the container or reactor, charged with any convenient refrigerant, may be used; such refrigerants as liquid ethylene, liquid ethane, liquid or solid carbon dioxide, ammonia, sulfur dioxide, liquid propane, or the like being usable. Alternatively, an internal refrigerant such as liquid ethylene, liquid ethane, liquid or solid carbon dioxide, liquid propane, or even liquid methyl or ethyl chloride may be used, depending upon the desired temperature. A preferred method of cooling the material is to add to the polymerization mixture a moderate amount of an internal refrigerant, the boiling temperature of which is not too low, adjusting the amount added, especially if the preferred material which is propane, is used until the mixed boiling point is at or slightly below the desired polymerization temperature. Then, as the polymerization proceeds and heat is released, a portion of the refrigerant is boiled out, condensed in a reflux condenser, and returned as very cold reflux. This procedure automatically maintains the temperature at the desired point.

The polymerization mixture may also advantageously contain an inert, non-reactive diluent, although such a diluent is not necessary for the invention; it merely gives a little better control of the characteristics of the resulting polymer. From one-half volume to about 5 volumes of diluent per volume of mixed olefins may be used; such substances as propane, pentane, hexane, heptane, light naphtha, ethyl or methyl chloride, and the like, being particularly suitable.

When the material has been cooled to the desired low temperature, it is polymerized by the addition to the cold mixture of an appropriate Friedel-Crafts type catalyst. For this purpose any of the Friedel-Crafts catalysts disclosed by N. O. Calloway in his article on the "Friedel-Crafts synthesis" printed in the issue of "Chemical Reviews" published for the American Chemical Society at Baltimore in 1935, in Volume XVII, No. 3, the article beginning on page 327, the list being particularly well shown on page 375, may be used. Of the catalysts disclosed by Calloway, aluminum chloride preferably in solution in a low-freezing, non-complex-forming solvent is commonly used. Alternatively, however, titanium tetra chloride either as such or in solution in a convenient low-freezing, non-complex-forming solvent is equally useful. Alternatively, boron trifluoride is nearly as good especially in solution in a hydrocarbon solvent such as butane, pentane, propane, ethyl or methyl chloride, or the like.

This solvent, to be low freezing, must have a freezing point below 0° C. To be non-complex-forming, it must show no substantial boiling point, freezing point, or osmotic pressure abnormalities or anomalies from the characteristics of ideal solutions; that is, it must form no stable chemical combination between secondary valences in the solvent and secondary valences in the solute; or in terms of the phase rule, the instillation of solvent to, or distillation of solvent from the solute must show substantially smooth temperature curves without appreciable breaks or anomalies. The preferred catalyst solvents are such substances as ethyl or methyl chloride, methyl dichloride, chloroform, ethylene dichloride, the various low-freezing chloro fluorides, carbon disulfide, ethane, propane, butane, the various light naphthas and the like being particularly useful, especially with composite catalysts such as aluminum chloro bromide or aluminum chlor ethoxide or the analogous salts of the other Friedel-Crafts metals, and the like. The hydrocarbon solvents are particularly effective for boron trifluoride, since solutions of relatively high concentration are readily prepared, which show a very effective catalytic power.

The fluid catalyst is preferably delivered into the body of the rapidly stirred, cold olefinic material under conditions of relatively high pressure and it is preferable that the catalyst be not delivered onto the surface of the cold mixture, because of the presence above the surface of substantial amounts of vaporized butadiene, which are polymerized alone into an infusible, insoluble butadiene polymer known by the workman as "popcorn," which is aptly descriptive of the substance obtained. However, butadiene may be added beneath the surface of the "active" (i. e., contains catalyst) feed without insoluble polymer formation, such as in a continuous polymerization.

The catalyst is preferably delivered at a relatively low rate of speed, depending to some extent upon the size of the cold batch of olefinic material; a 500-gallon batch of cold olefinic material preferably requiring about two hours for the delivery of the total amount of catalyst solution required.

It may be noted that from 0.5 to 3 pounds of metal halide catalyst are required per 100 pounds of olefinic material for the polymerization reaction.

According to the present invention, the proportions of multiolefin and monoolefin are adjusted to yield the desired polymer at the beginning of the polymerization reactions, or, if desired, over the first half or two-thirds or three-quarters of the reaction since the change in composition during the first portion of the polymerization is relatively slight with most mixtures. Then, at a convenient time, which may be as early as mid-polymerization stage, or as late as the addition of all of the catalyst, an appropriate amount of the less readily polymerizable material may be added. The amount of catalyst used is preferably somewhat less than sufficient to polymerize all of the olefinic material in the initial polymerization, and an after-polymerization with nearly spent catalyst, may, if desired, be relied upon to complete the copolymerization of the more easily polymerizable material with a substantial portion of the less easily polymerizable material. With butadiene and diisobutylene, the nearly spent catalyst is too low in potency to polymerize the dimer alone, but it will polymerize substantially all of the residual traces of butadiene and copolymerize them with the dimer in a proportion which can be controlled by the amount of dimer added, and by a minimum of trial, the after-polymerization can be made to yield a polymer closely similar in its characteristics to the initial polymer. If the introduction of the mono olefin is begun between mid-polymerization and three-fourths polymerization, the initial stream is usually quite small, and remains at a low level until nearly the end of the main polymerization, at which point it may be increased in volume, and the bulk of the extra mono olefins may be added after the initial polymerization has ceased, reliance being placed upon the after-polymerization for a final utilization of all of the butadiene present.

When the polymerization has reached the desired stage, there is practically no butadiene left in the mixture, and accordingly, the cold polymerization mixture may be recovered in any desired manner. A considerable quantity of naphtha may be added or a sufficient amount of dimer may be added to bring the material to a thoroughly liquid, pumpable, consistency, this latter procedure being preferable, since no additional substances are added, and only original raw materials are recovered from the reaction mix. The solid polymer may then be recovered by flashing the mixture after passage through a steam-heated tube, into a receiver drum, where the heat imparted to the mixture volatilizes out the diluent, dimer, catalyst solvent, and the like to leave a good grade of resin nearly solvent-free which is in fluid form and readily flows from the receiver. Alternatively, the cold mixture may be thrown into warm water which may be hot enough to vaporize out the diluent, catalyst solvent and dimer and produce a suspension of resin in water which may then be dried in the tunnel dryer or on the mill or by other means, as desired.

EXAMPLE 1

A mixture was prepared consisting of 50 parts by weight of butadiene of approximately 98% purity, and 50 parts by weight of diisobutylene of approximately 99% purity. This mixture was cooled to approximately −1° F. (−19° C.) by the addition of propane and polymerized by the addition of approximately two parts by weight of aluminum chloride dissolved in approximately 100 parts by weight of ethyl chloride, the catalyst solution being added to the cold olefinic mixture over a time interval of approximately 100 minutes. When the catalyst solution had been practically all added, approximately 30 parts by weight of additional diisobutylene were added and the material was allowed to stand in the reactor, under conditions for the return of very cold reflux refrigerant for an additional two and one-half hours.

At this point the material was found to be quite fluid, sufficiently so to flow readily out from the reactor, even at the low temperature set by the propane refrigerant. Approximately half of the contents of the reactor were allowed to flow out into an auxiliary receptacle in which the mixture was treated with approximately 10 parts by weight of isopropyl alcohol to inactivate the catalyst, and the polymer was then thrown into warm water, washed therein and dried on the mill. This material formed sample A, the evaluation for which is shown in the sub-joined Table I.

The remainder of the polymerization mixture was allowed to stand in the reactor overnight, without reflux refrigeration, thereby allowing the propane to boil off. The resulting polymer solution was found to be extremely viscous, so much so that it would not flow from the container, and approximately 50 parts by weight of light naphtha were added and worked into the polymer solution in order to permit it to flow from the reactor and to bring it into condition where it could be treated to neutalize the catalyst and washed and dried. This material formed sample B of Table I.

The resulting polymers were then evaluated, yielding the results shown in the following Table I:

*Table I*

| Sample No. | Parts Yield | Per Cent Yield (1,000 parts Original Feed) | Per Cent Loss on Heating Resin | Increase in Yield | Soft Pt. | Visc. | Color | Cook [1] Time |
|---|---|---|---|---|---|---|---|---|
|  |  |  |  | Per cent | ° C. |  |  | Hours |
| A | 540 | 102 | 7 | 13 | 71 | E | 9 | 8.5 |
| B | 540 | 114 | 9 | 23 | 79 | F | 10 | 6.7 |
| Control | 840 | 84 | 2 | 0 | 82 | G | 9 | 6.0 |

[1] Cooked at 15 gallon length at 565° F. in alkali refined linseed.

This table shows that a substantial portion of the added diisobutylene reacted in each instance, as is shown by the increase in yield and also by the somewhat lower softening points.

EXAMPLE 2

A mixture was prepared consisting of 550 parts of butadiene and 450 parts of diisobutylene (by weight). This material was placed in the reactor and diluted with 700 parts (by weight) of high purity propane, the mixture being held under a reflux condenser, cooled with liquid ethylene. The material was stirred thoroughly and the temperature stabilized at approximately −19° C. Simultaneously, a mixture consisting of 15 parts (by weight) of aluminum chloride in 500 parts (by weight) of ethyl chloride was prepared. This catalyst solution was then added to the cold olefinic mixture at the rate of approximately 6.7 parts of solution, containing 0.2 parts of aluminum chloride, per minute. The temperatures, amount of catalyst, and characteristics of the reaction are shown in the following reaction log:

| Time | Temp., °F. | Ml. Catalyst in— | Remarks |
|---|---|---|---|
| 11:40 A. M. | −16.6 | 0 | (700 parts propane added to charge-started catalyst.) |
| 11:50 A. M. | −10.3 | 70 | No reflux—no reaction. |
| 12:00 N. | −3.1 | 135 | Good reflux—good reaction. |
| 12:10 P. M. | −2.2 | 200 | Steady reflux—vigorous reaction. |
| 12:20 P. M. | −4.0 | 260 | Do. |
| 12:30 P. M. | −2.2 | 330 | Do. |
| 12:40 P. M. | −2.2 | 400 | Do. |
| 12:50 P. M. | −2.2 | 465 | Do. |
| 12:55 P. M. | −2.2 | 500 | Catalyst off. |
| 3 hrs. { 1:00 P. M. | +1.4 | | Added 300 parts diisobutylene. |
| 2:00 P. M. | −1.3 | | Little reflux—bubbles and foam. |
| 3:00 P. M. | −2.2 | | Do. |
| 4:00 P. M. | −3.1 | | Do. |
| | | | Off—added 100 parts isopropyl alcohol to kill catalyst. Let stand overnight. |

Polymer solution or resin solution was washed with water to remove $AlCl_3$, etc. Resin was dried at 250° C. for 20–30 minutes, Yield=1,000 parts.

Inspections on the products are listed:

| Per Cent Ash | Per Cent Fe | Iodine No. | R & B S. Point | Cook Time @ 15 gal./ length in alkali refined linseed oil 565° F. | Cure Point on Varnish as Tested at 200° C. | Per Cent Gel in Resin |
|---|---|---|---|---|---|---|
| | | | °C. | Hours | Sec. | |
| 0.01 | 0.00025 | 138.4 | 76 | 6.8 | 28 | 0.95 |

These results show the improvement in quality obtained by the addition at substantially the close of the reaction of additional quantities of the mono olefin.

EXAMPLE 3

A mixture consisting of 550 parts (by weight) of butadiene with 450 parts of diisobutylene and 700 parts of high-grade propane was prepared in a jacketed reactor as before, and the material was held under reflux from a reflux condenser, cooled by solid $CO_2$. Simultaneously, a catalyst solution consisting of 3.2 grams of aluminum chloride per 100 ml. of ethyl chloride was prepared, and approximately 469 parts (by weight) of catalyst were added, carrying with it approximately 15 parts (by weight) of aluminum chloride at the rate of 6.3 parts (by weight) of solution, or 0.2 parts (by weight) of aluminum chloride per minute. The following log of the reaction shows the course of the production of polymer:

| Time | Temp., °F. | Ml. Catalyst in— | Remarks |
|---|---|---|---|
| 1:20 p. m. | −16.6 | 0 | 700 ml. propane added—started catalyst. |
| 1:30 p. m. | −9.4 | 65 | (No reflux—no reaction—cloudy solution.) |
| 1:40 p. m. | −2.2 | 125 | Little reflux. |
| 1:50 p. m. | −0.4 | 185 | Good reflux—good reaction. |
| 2:10 p. m. | +1.4 | 250 | Do. |
| 2:20 p. m. | +1.4 | 315 | Do. |
| 2:30 p. m. | +2.3 | 375 | Good reflux—violent reaction. |
| 2:40 p. m. | +0.5 | 435 | Do. |
| 2:45 p. m. | +1.4 | 469 | Off—33 ml. in $CO_2$ exit condenser. |

Added 300 parts diisobutylene without killing catalyst with alcohol. Let stand 14 hours under reflux at +1.4° F.

At the end of the 14 hours reaction time, approximately 100 parts (by weight) of isopropyl alcohol were added to the reaction mixture to destroy the catalyst potency. The polymer solution was then allowed to drain from the reactor into a wash tank, where it was washed with water and dried. The yield of resin in percentage of the weight of the original mixture of butadiene and diisobutylene was 102%; showing the interpolymerization of substantial portions of the addition diisobutylene.

The characteristics of the polymer are well shown by the following inspection record:

| Per Cent Ash | Per Cent Fe | Iodine No. | R & B S. Point | Cook Time @ 15 gal./ length in alkali refined linseed oil 565° F. | Gardner Color of Varnish | Per Cent Gel in Resin |
|---|---|---|---|---|---|---|
| | | | °C. | Hours | | |
| 0.02 | 0.00025 | 127.5 | 84 | 6.3 | 8 | 0.70 |

EXAMPLE 4

A mixture was prepared consisting of 500 parts (by weight) of isoprene with 500 parts (by weight) of trimethyl ethylene and 500 parts (by weight) of methyl chloride. This mixture was put into an insulated reactor equipped with a reflux condenser cooled by solid carbon dioxide, the methyl chloride serving as the refrigerant and yielding a temperature of approximately −15° C. Simultaneously, a 3% solution of aluminum chloride in methyl chloride was prepared, and sufficient of the catalyst solution was added in a small stream over a period of two hours to polymerize approximately 60% of the olefinic material in the mixture. At this point the catalyst addition was ended and an additional 100 parts (by weight) of trimethyl ethylene was added to the reaction mixture. The mixture was then held under the reflux condenser for an additional 2½ hours at a temperature of approximately −10° C. At the end of this period the material was discharged into a wash tank and washed with warm water to volatilize out the methyl chloride and any unpolymerized olefinic material. The yield was then found to be 73% based on the original amount of mixed isoprene and trimethyl ethylene, showing that approximately 13% additional polymerization was obtained by the addition of the trimethyl ethylene and the prolonged standing under reflux in the presence of the nearly spent catalyst.

The resulting resin was solid and heat-reactive, heat-bodiable, soluble in linseed oil and heat-bodiable in and with the linseed oil.

EXAMPLE 5

A mixture was prepared consisting of 750 parts (by weight) of butadiene with 250 parts (by weight) of diisobutylene, together with 500 parts (by weight) of methyl chloride. This mixture was prepared in a heat-insulated reactor equipped with a reflux condenser, and the steady temperature was found to be approximately −15° C. Simultaneously, a 1.8% solution of aluminum chloride in methyl chloride was prepared and a sufficient amount added over a period of ½ hour to interpolymerize approximately 30% of the mixed unsaturates. At this point the catalyst addition was discontinued. Then 25 parts (by weight) of additional diisobutylene were added and the mixture was held under reflux for one hour at a temperature of approximately −10° C. At the end of this time, the material was discharged to a wash tank, the volatiles boiled out and the yield was found to be 39% by weight of the original mixture, showing that approximately 9% additional copolymerization occurred. The resulting product was washed carefully with water and dried in a vacuum to remove the water and as much as possible of the butadiene and diisobutylene. The resulting resin was a solid having an iodine number of 230. The melting point by the ring and ball method was 52° C. The resin was soluble in linseed oil and exceedingly heat-reactive in and with the linseed oil.

EXAMPLE 6

A mixture was prepared consisting of 60 parts (by weight) of butadiene and 40 parts (by weight) of isopentene, together with 60 parts (by weight) of methyl chloride, in an insulated reactor and held under reflux from a solid-$CO_2$-cooled reflux condenser. Simultaneously, a 3.1% solution of aluminum bromide in ethyl chloride was prepared and a small stream of catalyst solution was added to the olefinic material over a period of one hour to polymerize approximately 54% of the unsaturates. At this point an additional 10 parts of isopentene was added and a small amount, a trace, of additional catalyst, approximately 0.08% of the original olefinic material, was also added. This mixture was held under the reflux condenser for an additional hour at approximately −10° C. The resin solution was then discharged to a wash tank where it was washed with water and then dried. The yield of solid resin was 79% by weight of the original butadiene-pentene mixture, showing a gain of 25% polymerization after the addition of the extra pentene. The resulting resin was highly uniform and showed a melting point by the ring and ball method of 112° C. A portion of the solid polymer resin was dissolved at 15 gal./length in linseed oil and the mixture was found to cook satisfactorily in two hours at 565° F., showing the production of an excellent resin.

EXAMPLE 7

A mixture was prepared consisting of 50 parts (by weight) of butadiene and 60 parts (by weight) of pentene, together with 60 parts (by weight) of methyl chloride, in an insulated reactor and held under reflux from a solid-$CO_2$-cooled reflux condenser. Simultaneously, a 3.1% solution of aluminum bromide in ethyl chloride was prepared and a small stream of catalyst solution was added to the olefinic material over a period of one hour to polymerize approximately 54% of the unsaturates. At this point an additional 10 parts of butadiene was added and a small amount, a trace, of additional catalyst, approximately 0.08% of the original olefinic material, was also added. This mixture was held under the reflux condenser for an additional hour at approximately −10° C. The resin solution was then discharged to a wash tank where it was washed with water and then dried. The yield of solid resin was 79% by weight of the original butadiene-pentene mixture, showing a gain of 25% polymerization after the addition of the extra butadiene. The resulting resin was highly uniform and showed a melting point by the ring and ball method of 112° C. A portion of the solid polymer resin was dissolved at 15 gal./length in linseed oil and the mixture was found to cook satisfactorily in two hours at 565° F., showing the production of an excellent resin.

Thus the process of the invention copolymerizes a multiolefin and a monoolefin at reduced temperature by the application to the cold olefinic mixture of a Friedel-Crafts catalyst, and adds additional portions of the more easily polymerizable component after a substantial portion of the polymerization has been completed.

The invention claimed is:

1. In a polymerization process for the copolymerization of a mixture of olefinic reactants containing a total of from 40% to 80% of butadiene and from 60% to 20% of an isomonoolefin having from 5 to 8 carbon atoms per molecule, which comprises copolymerizing a mixture of butadiene and the isomonoolefin in the presence of an inert diluent-refrigerant at a temperature within the range between +15° C. and −35° C. by a liquid catalyst solution containing about 2% to 3% of aluminum chloride dissolved in an alkyl chloride selected from the group consisting of ethyl chloride and methyl chloride, the improvement which consists of the steps of preparing a reactant mixture containing all of the butadiene and from ⅗ to 10/11 of the total isomonoolefin reactant, which mixture will yield initially a polymer which is non-rubbery and which has an iodine number within the range between 50 and about 250 and a Staudinger molecular weight within the range of about 1,000 and 20,000, diluting said mixture by the addition to said olefin reactants of an inert diluent-refrigerant, copolymerizing said mixture at a temperature within the range between +15° C. and —35° C. by the continuous slow addition thereto of a stream of said liquid catalyst solution, continuing said copolymerization at a temperature within said range until at least 50% of the mixed olefinic reactants have undergone polymerization and until the composition of the unpolymerized residual mixture of olefinic reactants has substantially changed due to faster reaction of the isomonoolefin, to such an extent that the copolymer produced no longer has a uniform average composition approximating that desired, then adding a second portion of reactant consisting of the remaining isomonoolefin component, continuing said copolymerization until substantially all of the butadiene component has been copolymerized, and isolating the desired copolymer of butadiene and isomonoolefin from the solution of diluent-refrigerant and residual olefins.

2. In a polymerization process for the copolymerization of a mixture of olefinic reactants containing a total of from 40% to 80% of butadiene and from 60% to 20% of diisobutylene which comprises copolymerizing a mixture of butadiene and diisobutylene in the presence of an inert diluent refrigerant at a temperature within the range between +15° C. and —35° C. by a liquid catalyst solution containing about 2% to 3% of aluminum chloride dissolved in an alkyl chloride selected from the group consisting of ethyl chloride and methyl chloride, the improvement which consists of the steps of preparing a reactant mixture containing all of the butadiene and from 3/5 to 10/11 of the total diisobutylene reactant, which mixture will yield initially a polymer which is non-rubbery and which has an iodine number within the range between 50 and about 250 and a Staudinger molecular weight within the range of about 1,000 and 20,000, diluting said mixture by the addition to said olefin reactants of an inert diluent-refrigerant, copolymerizing said mixture at a temperature within the range between +15° C. and —35° C. by the continuous slow addition thereto of a stream of said liquid catalyst solution, continuing said copolymerization at a temperature within said range until at least 50% of the mixed olefinic reactants have undergone polymerization and until the composition of the unpolymerized residual mixture of olifinic reactants has substantially changed due to faster reaction of the isomonoolefin, to such an extent that the copolymer produced no longer has a uniform average composition approximating that desired, then adding a second portion of reactant consisting of the remaining diisobutylene, continuing said copolymerization until substantially all of the butadiene component has been copolymerized, and isolating the desired copolymer of butadiene and diisobutylene from the solution of diluent-refrigerant and residual olefins.

3. In a polymerization process for the copolymerization of a mixture of olefinic reactants containing from 40% to 80% of butadiene and from 60% to 20% of an isopentene which comprises copolymerizing a mixture of butadiene and isopentene in the presence of an inert diluent-refrigerant at a temperature within the range between +15° C. and —35° C. by a liquid catalyst solution containing about 2% to 3% of aluminum chloride dissolved in an alkyl chloride selected from the group consisting of ethyl chloride and methyl chloride, the improvement which consists of the steps of preparing a reactant mixture containing all of the butadiene and from 3/5 to 10/11 of the total isopentene reactant, which mixture will yield initially a polymer which is non-rubbery and which has an iodine number within the range between 50 and about 250 and a Staudinger molecular weight within the range of about 1,000 and 20,000, diluting said mixture by the addition to said olefin reactants of an inert diluent-refrigerant, copolymerizing said mixture at a temperature within the range between +15° C. and —35° C. by the continuous slow addition thereto of a stream of said liquid catalyst solution, continuing said copolymerization at a temperature within said range until at least 50% of the mixed olefinic reactants have undergone polymerization and until the composition of the unpolymerized residual mixture of olefinic reactants has substantially changed due to faster reaction of the isopentene, to such an extent that the copolymer produced no longer has a uniform average composition approximating that desired, then adding a second portion of reactant consisting of the remaining isopentene, continuing said copolymerization until substantially all of the butadiene component has been copolymerized, and isolating the desired copolymer of butadiene and isopentene from the solution of diluent-refrigerant and residual olefins.

DAVID W. YOUNG.
WILLIAM J. SPARKS.
JOHN D. GARBER.

REFERENCES CITED

The following references are of record in the file of this patent:

UNITED STATES PATENTS

| Number | Name | Date |
| --- | --- | --- |
| 2,092,295 | Van Peski | Sept. 7, 1937 |
| 2,100,900 | Fikentscher | Nov. 30, 1937 |
| 2,142,980 | Huijser | Jan. 3, 1939 |
| 2,311,004 | Thomas | Feb. 16, 1943 |
| 2,356,128 | Thomas | Aug. 22, 1944 |
| 2,394,266 | Soday | Feb. 5, 1946 |
| 2,476,000 | Sparks | July 12, 1949 |